United States Patent
Maloum et al.

(10) Patent No.: US 8,043,501 B2
(45) Date of Patent: Oct. 25, 2011

(54) REAGENT INJECTOR FOR EQUIPPING A WATER TREATMENT REACTOR, COMPRISING A NOZZLE ASSOCIATED WITH A DISPERSING MEMBER, AND CORRESPONDING WATER TREATMENT DEVICE

(75) Inventors: Abderrahmane Maloum, Bures sur Yvette (FR); Abdelkader Gaid, Paris (FR)

(73) Assignee: OTV SA, Saint Maurice Cedex (FR)

( * ) Notice: Subject to any disclaimer, the term of this patent is extended or adjusted under 35 U.S.C. 154(b) by 369 days.

(21) Appl. No.: 12/300,912

(22) PCT Filed: May 16, 2007

(86) PCT No.: PCT/EP2007/054754
§ 371 (c)(1),
(2), (4) Date: Dec. 11, 2008

(87) PCT Pub. No.: WO2007/135054
PCT Pub. Date: Nov. 29, 2007

(65) Prior Publication Data
US 2009/0184061 A1    Jul. 23, 2009

(30) Foreign Application Priority Data
May 19, 2006 (FR) .................................. 06 04524

(51) Int. Cl.
*B05B 1/26* (2006.01)
*B01F 3/08* (2006.01)
*C02F 1/58* (2006.01)

(52) U.S. Cl. ........ 210/205; 210/220; 210/241; 239/515; 366/175.2

(58) Field of Classification Search ................ 210/205, 210/206, 219, 220, 249, 250, 241; 366/167.1, 366/174.1, 175.2, 345, 346; 239/280, 280.5, 239/281, 282, 283, 505, 513, 514, 515, 518
See application file for complete search history.

(56) References Cited

U.S. PATENT DOCUMENTS
1,753,019 A * 4/1930 Page ............................... 239/515
2004/0124265 A1 * 7/2004 Kaelberer ....................... 239/338

FOREIGN PATENT DOCUMENTS
| DE | 19654321 A1 | 6/1998 |
| DE | 19757795 A1 | 8/1999 |
| DE | 19902712 A1 | 8/1999 |
| WO | 02/060592 A | 8/2002 |

* cited by examiner

*Primary Examiner* — Nam Nguyen
*Assistant Examiner* — Lucas Stelling
(74) *Attorney, Agent, or Firm* — Coats & Bennett, P.L.L.C.

(57) ABSTRACT

The invention concerns a reactant injector for equipping a water treatment reactor, comprising a nozzle associated with a dispersing member, and a corresponding water treatment device. The invention concerns an injector (2) of a reagent into a reactor (2) of a water treatment device, characterized in that said injector (2) comprises at least one nozzle (21) for injecting a jet of said agent, said nozzle being associated with a member for dispersing (22) said jet.

10 Claims, 2 Drawing Sheets

REAGENT INJECTOR FOR EQUIPPING A WATER TREATMENT REACTOR, COMPRISING A NOZZLE ASSOCIATED WITH A DISPERSING MEMBER, AND CORRESPONDING WATER TREATMENT DEVICE

This application is a U.S. National Stage application of PCT Application No. PCT/EP2007/054754, with an international filing date of May 16, 2007. Applicant claims priority based on French application serial no. 0604524 filed May 19, 2006, and is incorporated herein by reference in its entirety.

The field of the invention is that of water treatment. More precisely, the invention relates to techniques for softening water, particularly drinking water, as well as techniques for treating water by decarbonation.

In the field of the invention, it is known to proceed to water decarbonation by removing calcium carbonate ($CaCO_3$) and magnesia ($Mg(OH)_2$) either by exchanging ions with a sodium resin, or by adding to the water to be treated a basic reagent causing a precipitation of the carbonates and the magnesia which must then be filtered. The reaction involved, either with sodium hydroxide, or with hydrated lime are as follows:

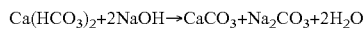

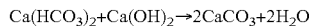

What is sought is therefore to have a drop of water hardness, i.e its total hardness (TH) which is often very high and can reach more than 50 degrees, so as to lower such TH to values advantageously between 8 and 15°, as recommended, for example, by the Conseil Supréieur d'Hygiène Publique de France (CS HPF).

According to a solution implemented in the industry, drinking water decarbonation for example, consists of incorporating in the treatment station a reactor wherein raw water is injected at its bottom portion and is treated with an alkaline agent of the above mentioned type inside a fine granular material used as a crystallisation seed to form calcium carbonate beads, and is maintained in fluidisation in the liquid mass.

Reactors for implementing such processes have been suggested in the prior art.

A well-known reactor of the prior art comprises, on one hand, in its lower portion, with an series of flat injectors made of two perforated grids each comprising a face with triangular teeth and disposed in a head-to-foot fashion, through which water is injected and, on the other hand, in its upper portion thereof, with an extension comprising a series of sloped blades forming an angle of 55 to 65 degrees with the vertical axis of the reactor. The alkaline agent is introduced through the injectors provided just above the floor with a staged distribution in the upright direction of the reactor.

The injectors (or nozzles) for diffusing the alkaline agent are incorporated in the reactor walls.

However, with this type of reactor, a calcium carbonate deposit is quite readily noticed on the alkaline agent injectors, which eventually will lead to an obstruction of the injectors.

It is then required to maintain the reactor, particularly in order to remove the obstruction in the injectors, or even to replace the injectors.

In practice, the calcium carbonate deposit is materialised as large blocks on the injectors.

These large blocks are manually removed from the injectors with a hammer and a burin. Of course, on all the injectors, such operation is long and tedious.

In order to access the injectors, the reactor is completely drained and washed, generally by an acid treatment.

In addition, calcium carbonate beads which were formed in the fine material serving as the crystallisation seed should be retrieved.

These interventions are very long in practice and therefore lead to large operating losses: when cumulated, the non-operating periods can reach 6 months within a year.

In addition, the reactor draining requires the arrest of the current seeding process. The reactor thus has to be inoculated after each draining, which considerably increases the length of the non-operating periods.

Calcium carbonate formation on alkaline agent nozzles should thus be reduced and/or slowed down, in order to delay the obstruction and allow less frequent maintenance interventions.

Current injectors are generally given an output diameter of about 8 mm.

However, it has been noticed that as the output diameter increases, the calcium carbonate deposition on the injectors increases as well, leading, as mentioned above, to the obstruction of the injectors, requiring the above mentioned interventions.

It is thus desirable to reduce as much as possible the output diameter of the injectors.

However, reducing the output diameter also reduces the capacity of the injectors to have a large reacted diffusion range, which prejudices the reaction and in accordance the reactor efficiency.

The invention is therefore particularly directed to water decarbonation devices, but also more generally to any treatment device comprising reagent injectors in a reactor, wherein the reagent may lead to the injectors' degradation or loss of effectiveness, thus requiring periodical injectors maintenance operations.

The particular purpose of the invention is to overcome this prior art drawback.

More precisely, the purpose of the invention is to provide a reagent injector in a water treatment reactor ensuring an effective dispersion of the reagent while reducing the reagent deposition on the injector or any other degradation thereof.

Another purpose of the invention is to provide such an injector which may be adapted according to different configurations in the water treatment reactors.

A further purpose of the invention is to provide such an injector with a simple design, easy to implement and inexpensive to manufacture.

These purposes, as well as other purposes which will appear thereafter, are achieved by the invention which is an injector of a reagent into a reactor of a water treatment device, characterised in that said injector comprises at least one nozzle for injecting a jet of said reagent, said nozzle being associated with a dispersion member of said jet.

Therefore, according to the invention, the injection means are associated with dispersion means advantageously allowing the injection means output diameter to be reduced and thus the reactant deposition thereon to be also reduced, while ensuring a satisfying diffusion of the reactant in the reactor.

For example, such a feature allows effective injection means to be provided with an output diameter of about 4 mm (as opposed to 8 mm according to the prior art).

According to an advantageous solution, said member is positioned facing said nozzle and has a dispersion surface extending over 360°.

Preferentially, said member has a cone shape which top portion is to be centred relatively to said jet.

"A back-nozzle" is also achieved, which is particularly effective and readily manufacturable.

According to an advantageous solution, the device comprises means for adjusting the distance between said nozzle and said member.

The distance between the injection means and the member associated therewith may also be adjusted, in order to ensure a satisfying dispersion of the alkaline agent, particularly according to the flow rate thereof.

In this case, said injector is carried by a body having an advantageous threaded cylindrical portion, said member comprising a threaded ring for cooperating with said threaded cylindrical portion.

In this way, simple and effective means for adjusting the distance between the injection means and the member which is associated therewith are achieved, and said distance can be readily modified by rotating the dispersion member on the element carrying the injection means.

Preferentially, said body carries a lock-nut mounted on said threaded cylindrical portion and to be tightened against said threaded ring.

According to an advantageous solution, said cone shape and said threaded ring are connected by a cutout cage wherein said nozzle is incorporated, said cage being preferably made of three branches distributed around said cone shape with an angle of about 120° therebetween.

The invention also relates to a water treatment device comprising a reactor and at least one reagent injector inside said reactor, characterised in that said injector or said injectors each comprise at least one nozzle for injecting a jet of said reagent, said nozzle being associated with a member for dispersing said jet.

According to a first embodiment of such device, the latter comprises support means for said injector or injectors, said support means being movably mounted relatively to said reactor between an active position wherein said injector or injectors are positioned inside said reactor and a retracted position wherein said injector or injectors are driven out of said reactor.

Such a device has numerous advantages in comparison to the prior art solutions, particularly in that:
- it is not necessary to drain the reactor in order to maintain the reagent injection means;
- it is not necessary to interrupt the current seeding process and, accordingly, it is possible to avoid the required reactor inoculation step.

Thanks to the invention, the reactor maintenance times, and particularly the reagent injection means maintenance times may be drastically reduced.

It is thus possible to consider serious operation gains.

In addition, maintenance operations may be carried out with a great time flexibility in comparison with the ones carried out with known techniques.

Indeed, in the past, the interventions were carried out most often in a hurry (and under generally uncomfortable conditions) to reduce as much as possible the reactor non-operating periods.

On the other hand, according to the invention, used nozzles may be repaired and/or maintained away from the reactor. The intervention then consists of removing from the reactor the nozzles requiring a maintenance and replacing them by an assembly ready-to-be-used comprising nozzles maintained in parallel (in masked time).

The personnel in charge of the maintenance may thus select the most appropriate moment to carry out the intervention and intervention times around the reactor are reduced.

According to a second embodiment of the device, said injector or injectors are fixedly mounted to a wall of said reactor.

In this case, said injector or injectors are preferably mounted to a body for extending perpendicularly to said wall, said body having at one of their ends an attachment plate to be plated against said wall, inside said reactor, and for cooperating with a back-plate plated on said wall outside said reactor.

Other features and advantages of the invention will readily appear in the following description of two preferable exemplary embodiments of the invention, given as illustrations and, not limitations, and drawings in which.

As previously indicated, the principle of the invention is to provide reagent injectors for a water treatment reactor by combining a nozzle and a reactant dispersion member.

The following part of the description refers to an application of the invention to a water decarbonation device.

Figure 1:
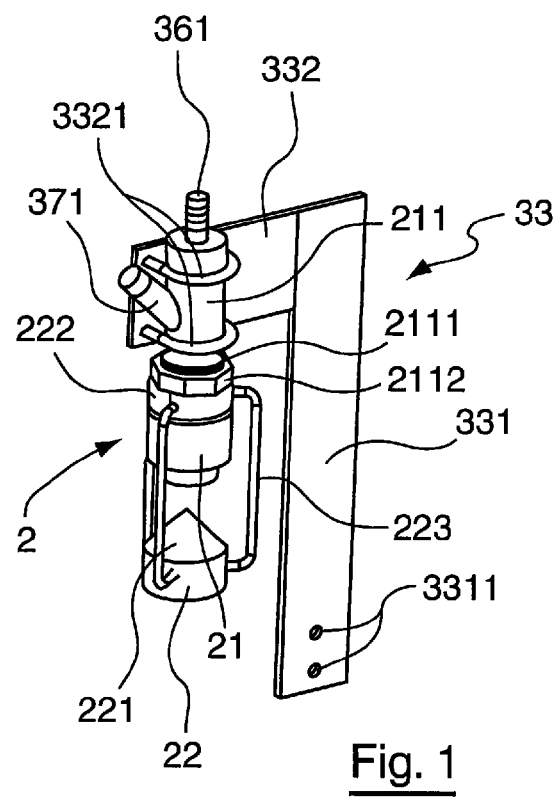
FIG. 1 is a view of an injector according to the invention, mounted according to a first embodiment.
Figure 2:
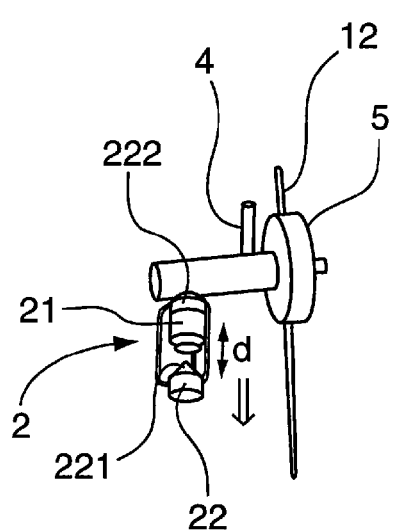
FIG. 2 is a view of an injector according to the invention, mounted according to a second embodiment.

This is illustrated by FIGS. 1 and 2 which show an injector 2 comprising a nozzle 21 combined to a dispersion member 22 for providing the dispersion of the alkaline agent jet coming from the nozzle 21.

According to this embodiment, the member 22 has a cone shape 221, which top portion thereof is directed towards and centred relatively to the nozzle, such cone shape 221 providing a dispersion surface extending over 360° and allowing the jet to be turned into an umbrella shape.

In addition, this member is mounted with an adjustable height relatively to the nozzle 21, in order to adjust the distance between the top portion of the cone shape and the outlet of the nozzle 21, which allows the alkaline agent dispersion to be optimised.

For example, the top portion of the cone shape is indicatively positioned at a distance of about 15 to 20 mm from the nozzle outlet.

In this purpose, the member 22 comprises a threaded ring 222 mounted to a threaded portion 2111 of the body 211. It is understood that a rotation of the threaded ring on the portion of the threaded ring 2111 leads to a vertical translation of the member 22 relatively to the body 211 and therefore a variation of the distance between the top portion of the cone shape 221 and the nozzle 21 (which is in turn attached to the body 211).

A locknut 2112 is provided on the threaded portion 2111 to ensure the member 22 is maintained in a vertical position, while being tightly clamped against the threaded ring 222 of the member 22.

As can be seen, the cone shape 221 is connected to the threaded ring 2111 through three branches 223 distributed at 120° and together defining a cutout cage in which the nozzle 21 is incorporated.

Figure 5:
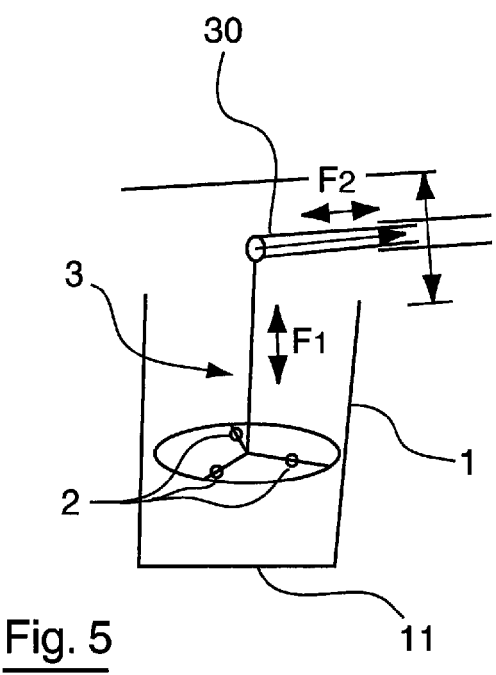
FIG. 5 is a block diagram of a decarbonation reactor incorporating a structure as the one illustrated in FIG. 3.

The purpose of the embodiment in FIG. 1 is to provide a water decarbonation device, which principle is schematically illustrated in FIG. 5, showing a reactor 1 in which raw water to be treated is injected at the floor portion 11, the water being treated with an alkaline agent inside a fine granulated material (for example sand).

The alkaline agent is injected by injectors 2 carried by a vertically movable carrying structure 3 as symbolised by the arrow F1.

It is understood that with this carrying structure 3, the injectors 2 can be driven out of the reactor vessel in a retracted position, a maintenance operation can be carried out thereon (and/or inside the reactor), and then the injectors can be brought back inside the reactor in an active position.

Preferably, the carrying structure 3 is mounted on a horizontal telescopic arm 30 allowing the carrying structure 3, driven in a retracted position, to be horizontally moved as symbolised by the arrow F2. The carrying structure may thus be brought in a disengaging position, on the reactor side.

It is noticed that means for vertically and possibly horizontally moving the carrying structure may be incorporated in a relatively reduced height space, extending, for example, between the top end of the reactor and a building ceiling in which the reactor is installed.

According to a preferred solution illustrated in FIG. 4, the carrying structure comprises a tower 31 for extending inside the reactor coincidentally with the vertical axis thereof, the tower 31 having its lower end radial extensions 32 on which the injectors are attached, as will be explained in detail thereafter.

According to this embodiment, the tower 31 has three radial extensions 32 which form in pairs an angle of 120°, a strapping 321 being secured at the ends of the extensions 32 to form a rapid assembly.

The strapping 321 is secured to the extensions, for example, by welding.

At its top end, the tower 31 is coupled to a hoisting sling 34 passing through a mounted pulley at the end of the above mentioned telescopic arm, and connected to a remote hoisting winch.

Advantageously, the sling 34 is removably coupled to the tower 31, for example through a shackle 35.

In addition, feeding ducts for the injectors 2 extend along the carrying structure. In this case, two flexible feeding ducts are provided for each injector 2, one for feeding sodium, the other for feeding softened water.

Figure 4:
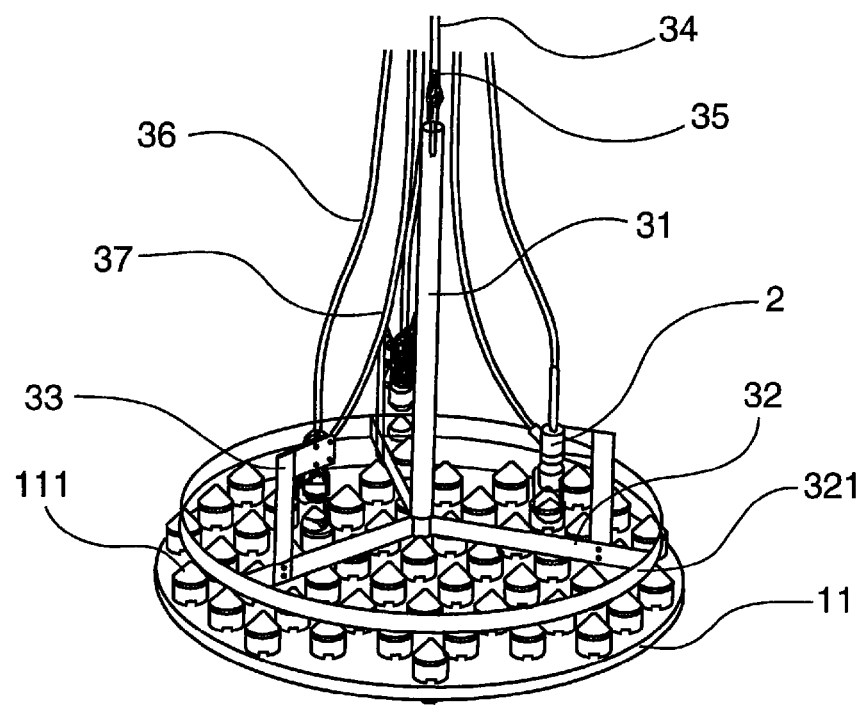
FIG. 4 is a view of a movable structure supporting an injector according to the embodiment of FIG. 1.

FIG. 4 shows a carrying structure as just described, in an active position, i.e near the floor 11 of the reactor.

It is noticed that the floor 11 has a plurality of introduction means in the reactor of water to be treated, such introduction means being designed as a strainer 111.

It is also noticed that the floor 11 is advantageously made from a clear, stiff, reinforced PVC material, such as the material known as TRICOCLAIR (registered trade mark).

Besides, the injectors 2 are mounted to the radial extensions 32 through jib cranes 33 the description thereof referring to FIG. 1.

As can be seen in FIG. 1, the jib cranes 33 are obtained by assembling metal plates 331, 332, for example by welding (the jib cranes may also be made as a single piece) and are provided so as to have the injectors 2 above the extensions 32.

The plate 331 provides the jib crane post and has at its bottom portion holes 3311 through which attachment means of the jib crane on an extension, for example by bolting, can pass.

The plate 332 is in turn designed for carrying an injector 2.

In this purpose, the body 211 of the injector 2 carrying the nozzle 21 is attached to the plate 332 through two flanges 3321 bolted to the plate.

It is noticed that the body 211 has two connecting end pieces 361, 371 for a respective connection to the sodium duct 37 and softened water duct 36 mentioned above, the end piece 361 extending in the axial direction of the body 211 and the end piece 371 laterally extending from the body 221.

In such configuration, the flanges 3321 are advantageously provided on either side of the end piece 371.

Figure 3:
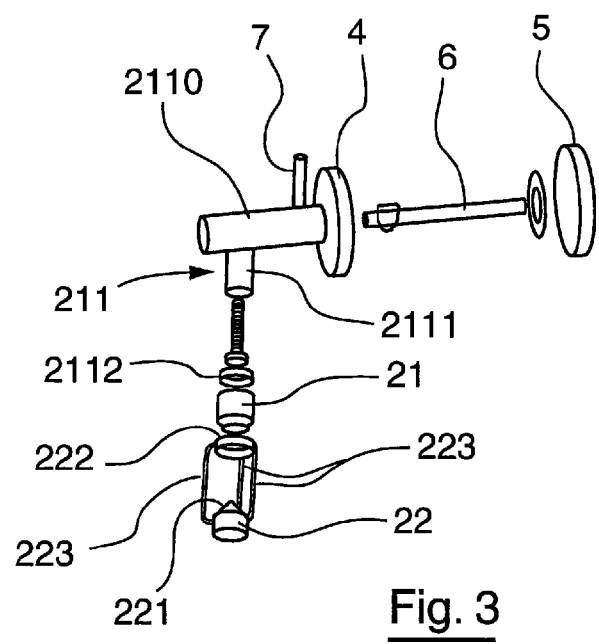
FIG. 3 is an exploded view of the embodiment illustrated in FIG. 2.

FIGS. 2 and 3 illustrate another embodiment wherein an injector 2 according to the invention is fixedly mounted to the wall 12 of a decarbonation reactor.

In this purpose, the injector is carried by a body 2111 having an extension 2110 for extending perpendicularly to the wall 12 of the reactor.

The extension 2110 of the body has at one of its ends a plate 4 for cooperating with the back-plate 5 for securing the injector on the wall 12, the wall being mountingly inserted between the plate 4 and the back-plate 5 (the assembly being secured by bolting both plates) which are then plated against the wall.

A duct 6 is incorporated in the extension 2110 and connects to a sodium feed.

The body 2110 further has a bypass 7 for conveying softened water towards the injector.

The invention claimed is:

1. A water treatment system, comprising:
   a reactor containing water to be treated;
   a reagent dispersing member disposed within the reactor, the dispersing member including:
      a nozzle for injecting a reagent into the reactor;
      a dispersion member disposed below the nozzle, the dispersion member having a generally cone shape including a tip;
      a height adjusting mechanism for adjusting the distance between the nozzle and the dispersion member;
      the tip of the dispersion member generally facing the nozzle such that when the nozzle injects the reagent into the reactor the reagent contacts the dispersion member and is dispersed into the reactor in a generally conical pattern;
   a reagent inlet operatively connected to the reagent dispersing member for directing the reagent into the nozzle; and
   a carrier frame moveable with respect to the reactor, the carrier frame supporting the reagent dispersing member within the reactor.

2. The water treatment system of claim 1 wherein the height adjusting mechanism includes:
   a projection extending upwardly from the nozzle, the projection having a threaded portion and a threaded ring rotatively mounted to the threaded portion;
   a plurality of connectors interconnecting the threaded ring with the dispersion member; and
   wherein rotation of the threaded ring on the threaded portion of the projection results in a vertical translation of the dispersion member relative to the nozzle.

3. The water treatment system of claim 2 wherein the height adjusting mechanism further comprises a nut rotatively mounted on the threaded portion, wherein when the nut is fitted against the threaded ring the nut sets the distance between the nozzle and the dispersion member.

4. The water treatment system of claim 2 wherein each of the plurality of connectors is spaced apart such that each connector forms an approximately 120° angle with another of the plurality of connectors.

5. The water treatment system of claim 2 wherein the nozzle is disposed interiorly of the plurality of connectors.

6. The water treatment system of claim 1 wherein the reagent inlet is a first reagent inlet and is operatively connected to a first reagent line for supplying the reagent to the reagent dispersing member.

7. The water treatment system of claim 6 further comprising:
- a second reagent inlet operatively connected to the reagent dispersing member; and
- a second reagent line operatively connected to the second reagent inlet for supplying a second reagent to the reagent dispersing system.

8. The water treatment system of claim 1 further comprising:
- a vertical flange extending upwardly from the carrier frame such that a lower end of the vertical flange is operatively connected to the carrier frame; and
- a horizontal flange operatively connected to an upper end of the vertical flange, the horizontal flange operatively connected to the reagent dispersing member.

9. The water treatment system of claim 1 wherein the reagent dispersion member includes a height adjusting mechanism for adjusting the distance between the nozzle and the dispersion member, the height adjusting mechanism including:
- a projection extending upwardly from the nozzle, the projection having a threaded portion and a threaded ring and nut rotatively mounted to the threaded portion;
- a plurality of connectors, wherein the each of the connectors extends from the threaded ring to the dispersion member, the connectors spaced apart such that each connector forms an approximately 120° angle with another of the plurality of connectors;
- wherein rotation of the threaded ring on the threaded portion of the projection results in a vertical translation of the dispersion member relative to the nozzle; and
- wherein when the nut is fitted against the threaded ring the nut sets the distance between the nozzle and the dispersion member.

10. A water treatment system comprising:
- a reactor containing water to be treated;
- a reagent dispersing member disposed within the reactor, the dispersing member including:
  - a nozzle for injecting a reagent into the reactor;
  - a dispersion member disposed below the nozzle, the dispersion member having a generally cone shape including a tip;
  - a height adjusting mechanism for adjusting the distance between the nozzle and the dispersion member;
  - the tip of the dispersion member generally facing the nozzle such that when the nozzle injects the reagent into the reactor the reagent contacts the dispersion member and is dispersed into the reactor in a generally conical pattern;
- a reagent inlet operatively connected to the reagent dispersing member for directing the reagent into the nozzle;
- a carrier frame moveable with respect to the reactor, the carrier frame supporting the reagent dispersing member within the reactor;
- a vertical flange extending upwardly from the carrier frame such that a lower end of the vertical flange is operatively connected to the carrier frame; and
- a horizontal flange operatively connected to an upper end of the vertical flange, the horizontal flange operatively connected to the reagent dispersing member.

* * * * *